US011604289B2

(12) United States Patent
Abramov (10) Patent No.: US 11,604,289 B2
(45) Date of Patent: Mar. 14, 2023

(54) IMAGING SATELLITE HAVING MIRROR FORMED FROM LIQUID AND TWO-AXIS ROTATIONAL CONFIGURATION (71) Applicant: Igor Abramov, Vista, CA (US)

(72) Inventor: Igor Abramov, Vista, CA (US)

(*) Notice: Subject to any disclaimer, the term of this patent is extended or adjusted under 35 U.S.C. 154(b) by 448 days.

(21) Appl. No.: 16/838,035

(22) Filed: Apr. 2, 2020

(65) Prior Publication Data
US 2020/0319352 A1 Oct. 8, 2020

Related U.S. Application Data (60) Provisional application No. 62/828,481, filed on Apr. 3, 2019.

(51) Int. Cl.
G02B 5/10 (2006.01)
G02B 23/06 (2006.01)
B64G 1/10 (2006.01)
B64G 1/22 (2006.01)
B64G 1/66 (2006.01)
G01S 19/48 (2010.01)
G02B 1/04 (2006.01)
G02B 5/08 (2006.01)
G02B 23/02 (2006.01)

(52) U.S. Cl.
CPC .......... G01S 19/485 (2020.05); B64G 1/1021 (2013.01); B64G 1/222 (2013.01); B64G 1/66 (2013.01); G02B 1/04 (2013.01); G02B 5/08 (2013.01); G02B 5/10 (2013.01); G02B 23/02 (2013.01); G02B 23/06 (2013.01)

(58) Field of Classification Search
CPC ..... B64G 1/10–1085; B64G 2001/1028–1092; B64G 1/22; B64G 1/66; B64G 1/68; G01S 19/485; G02B 5/08; G02B 5/0808; G02B 5/10; G02B 23/02; G02B 23/06
See application file for complete search history.

(56) References Cited

U.S. PATENT DOCUMENTS

| 6,254,243 | B1 * | 7/2001 | Scrivens | G02B 5/10 359/884 |
| 6,533,426 | B2 * | 3/2003 | Carreras | G02B 5/10 359/846 |
| H2123 | H * | 9/2005 | Mollenhauer | 427/161 |
| 9,709,713 | B1 * | 7/2017 | Chen | G02B 5/0841 |
| 2005/0117232 | A1 * | 6/2005 | Forsberg | G02B 5/08 359/843 |

* cited by examiner

Primary Examiner — Ryan S Dunning (57) ABSTRACT

A satellite with a primary imaging mirror fabricated while in space is described. The primary mirror is formed by solidifying liquid precursor material which assumes a paraboloid shape upon certain rotational maneuvers of the satellite. The primary mirror is preferably formed from a molten metal which creates a rigid paraboloid primary mirror upon solidification. The mirror material can be pre-melted prior to launch and carried to orbit while liquid, or it can be stored as a solid and melted in space to create the mirror.

22 Claims, 12 Drawing Sheets

IMAGING SATELLITE HAVING MIRROR FORMED FROM LIQUID AND TWO-AXIS ROTATIONAL CONFIGURATION

CROSS-REFERENCE TO RELATED APPLICATION

This Application claims the benefit of Provisional Application Ser. No. 62/828,481 filed on 2019 Apr. 3, titled "Imaging Satellite".

FIELD OF INVENTION

This invention relates in general to space satellites and in particular to miniature imaging satellites with imaging capabilities.

BACKGROUND OF INVENTION

At present, space satellites equipped with imaging systems are quite large in order to accommodate large optical structures required for high resolution imaging. A common satellite imaging system is a reflective telescope which contains a large primary mirror. This mirror is customarily made of a single piece of cast and highly polished glass.

Since the mirror is relatively fragile, it has to be securely supported mechanically during launch to prevent its damage. The mirror support structure(s) introduce considerable added weight and bulk to the overall imaging system, complicating its packaging for launch, and increasing launch costs.

Recent adoption and proliferation of miniature so called 'cube'- and 'nano'-satellites ('cube-sats') introduce a new paradigm to space exploration and utilization. However, the cube-sats at present lack high-resolution imaging capabilities, since they cannot accommodate large telescope primary mirrors required for such imaging and are limited to small aperture/low resolution imaging systems.

Yet, such a capability would greatly enhance the utility of cube-sats and put their performance close to, or on-par with, the large space telescopes currently deployed.

Objectives of the Invention

Thus, it is the objective of instant invention to provide a high resolution imaging capability to miniature cube-sats.

Another objective is to provide a relatively large primary mirror to a miniature cube-sat to enhance its imaging capability.

Yet another objective is to provide a primary imaging mirror which would not require complex and heavy structural supports during the launch of the satellite.

Another objective is to provide a primary imaging mirror which would be fabricated in space, in-place.

Yet another objective is to provide a primary imaging mirror which would be lightweight.

Another objective is to provide a primary imaging mirror which could be repaired or re-fabricated in space, in-place.

SUMMARY OF THE INVENTION

In accordance with the present invention, a miniature cube-sat with a primary imaging mirror fabricated while in-orbit is described.

The primary mirror is formed by solidifying liquid which assumes a paraboloid shape upon certain rotational maneuvers of the satellite.

The primary mirror is preferably formed from a molten metal which creates a rigid paraboloid primary mirror upon solidification.

The mirror material can be pre-melted prior to launch and carried to orbit while liquid, or it can be stored as a solid and melted in space to create the mirror.

Prior Art

It has been known since 1600's that a surface of liquid spun around a vertical axis assumes a paraboloid shape. On the surface of the Earth parabolic telescope mirrors created with spinning layer of liquid mercury have also been known for some time. Indeed, relatively recently NASA Liquid Mirror Telescope ('LMT') and Canadian Large Zenith Telescope ('LZT') are just examples of such spinning mercury large telescopes. These telescopes share a common shortcoming, however: they can only be pointed vertically (i.e. towards zenith) and cannot be aimed in other directions.

There are also proposals for parabolic mirrors spin-cast from epoxy (US H2123 to Mollenhauer et al., U.S. Pat. No. 6,254,243 to Scrivens, U.S. Pat. No. 6,533,426 to Carreras et al.), made of magnetic rheological fluids, etc.

However, none of the prior art above suggests or teaches a specific satellite which would generate its own parabolic primary mirror while in space, as per instant invention.

Objects and Advantages

In contrast to the prior art mentioned hereinabove, the present invention describes a satellite which would be, while being compact at launch, when in space would create and deploy a primary parabolic mirror of the size enabling high resolution imaging.

Having a large aperture (diameter) of the primary optical component, such as a primary mirror, is critical for improved imaging, since resolution is directly related to the aperture:

$$\alpha_D = 1.22 \frac{\lambda}{D} \qquad (1)$$

Where
 $\alpha_D$ is angular resolution (smaller value is desirable)
 $\lambda$ is wavelength of light
 D is the aperture (optical element effective diameter)

The satellite will not require specialized mirror supports for protection during launch and will work with a wide variety of mirror materials. Depending on the materials used, the resulting primary mirror can also be much lighter than the present glass-based ones, saving on launch cost and complexity

DESCRIPTION OF THE EMBODIMENTS

In the foregoing description like components are labeled by the like numerals.

Figure 1:
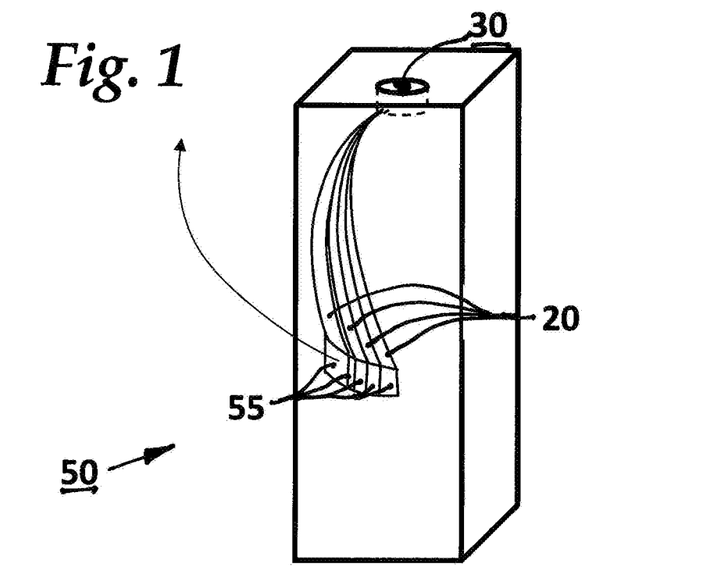
FIG. 1 is a perspective view of the imaging satellite in storage and launch configuration.

Referring to FIG. 1, satellite 50 comprises a plurality of essentially pie slice-shaped segmented mirror supports 20 which are folded for compact storage along sides of satellite 50. Supports 20 further comprise optional hinged stray light baffles 55 attached to them.

Figure 2:
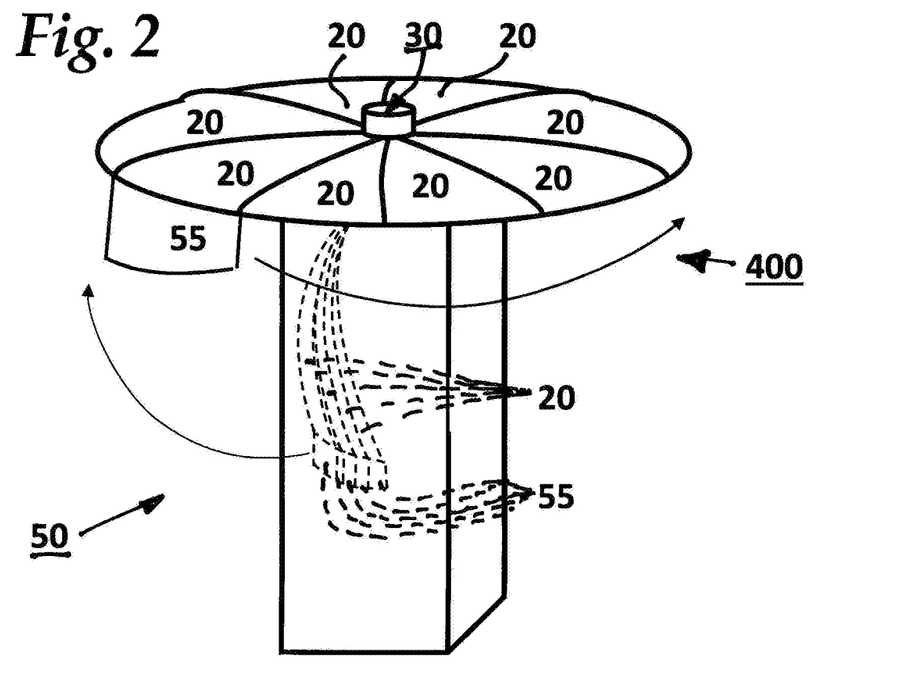
FIG. 2 is a perspective view of the satellite while mirror supports are deployed.

FIG. 2 shows mirror supports 20 deployed in a circular fashion, interlocked, and connected to mirror material container assembly 30. Optional light baffles 55 which are connected to each other with pleated light screen 56 form a continuous light shield around interlocked mirror supports 20.

Figure 10:
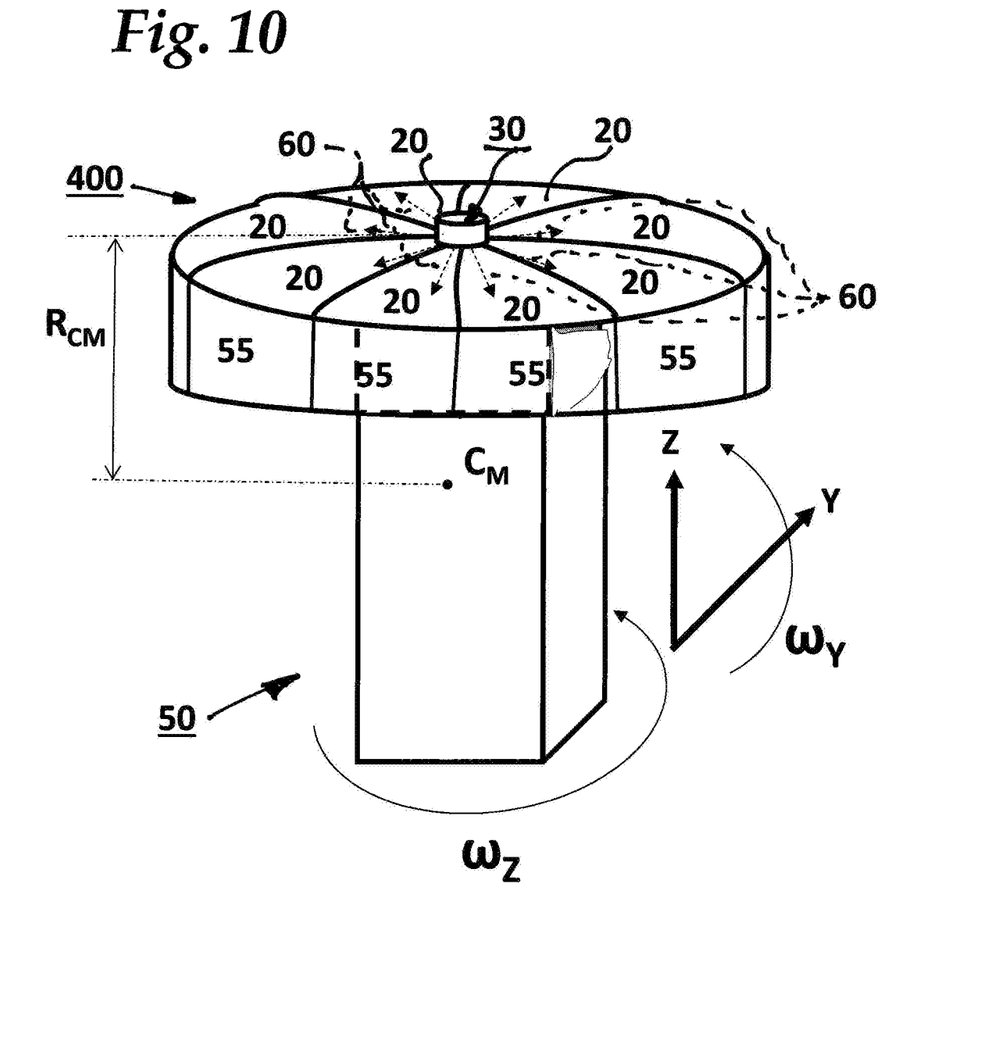
FIG. 10 is a perspective view of satellite with the primary mirror generated and light baffle deployed.

Referring to FIG. 10, satellite 50 is at the beginning of a simultaneous spin around the satellite's Y-axis with angular velocity $\omega_Y$ and around the satellite's Z-axis with angular velocity $\omega_Z$. The liquid mirror material 60 starts to emerge from container 30 to fill mirror supports 20.

Figure 16:
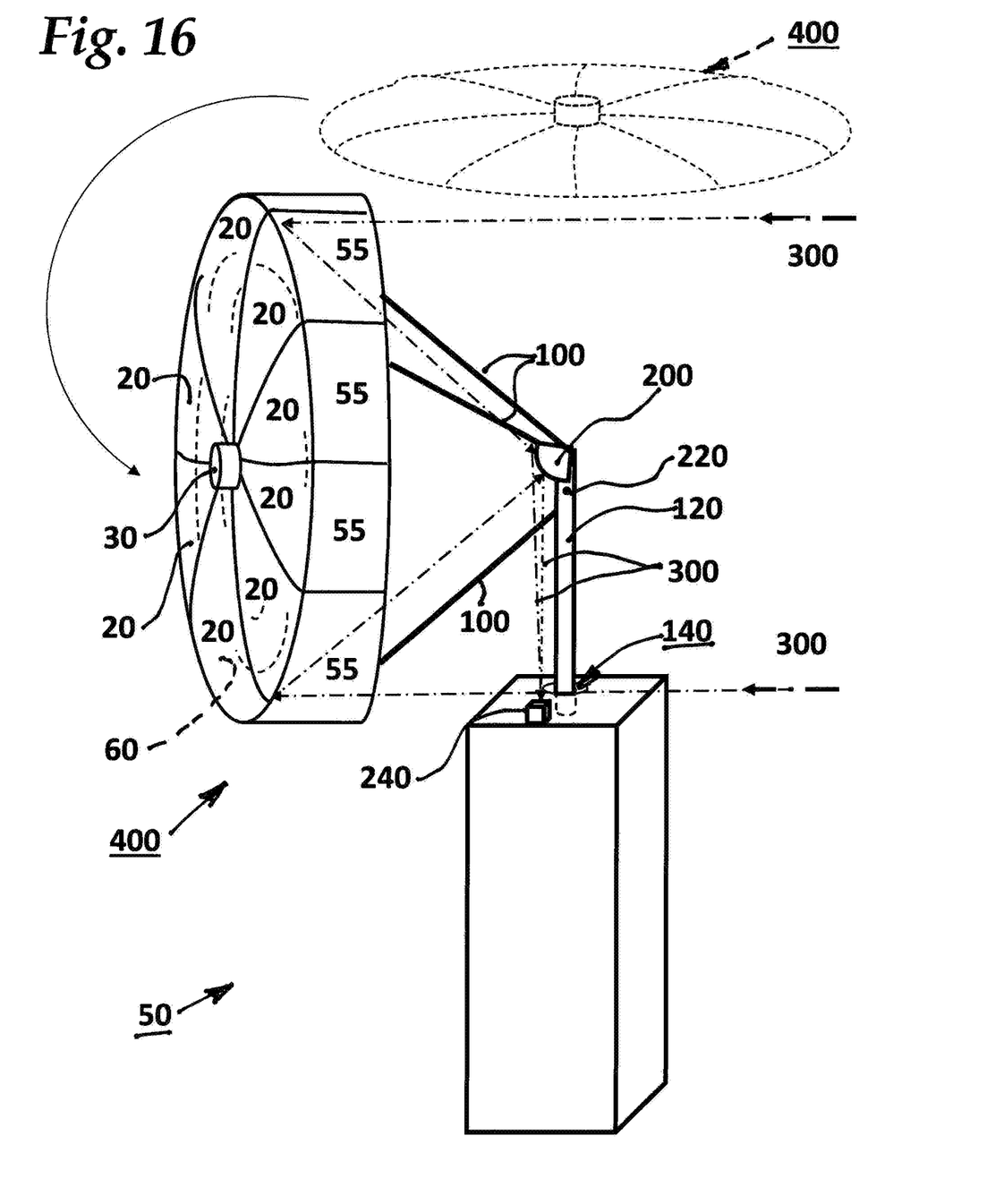
FIG. 16 is a perspective view of the satellite with primary mirror assembly fully deployed

In its operational configuration shown on FIG. 16, satellite 50 has the primary mirror assembly 400 comprising mirror supports 20 and solidified mirror material 60 tilted with respect to the satellite body to permit light 300 from the observed object to be captured and conveyed to imager 240.

Figure 17:
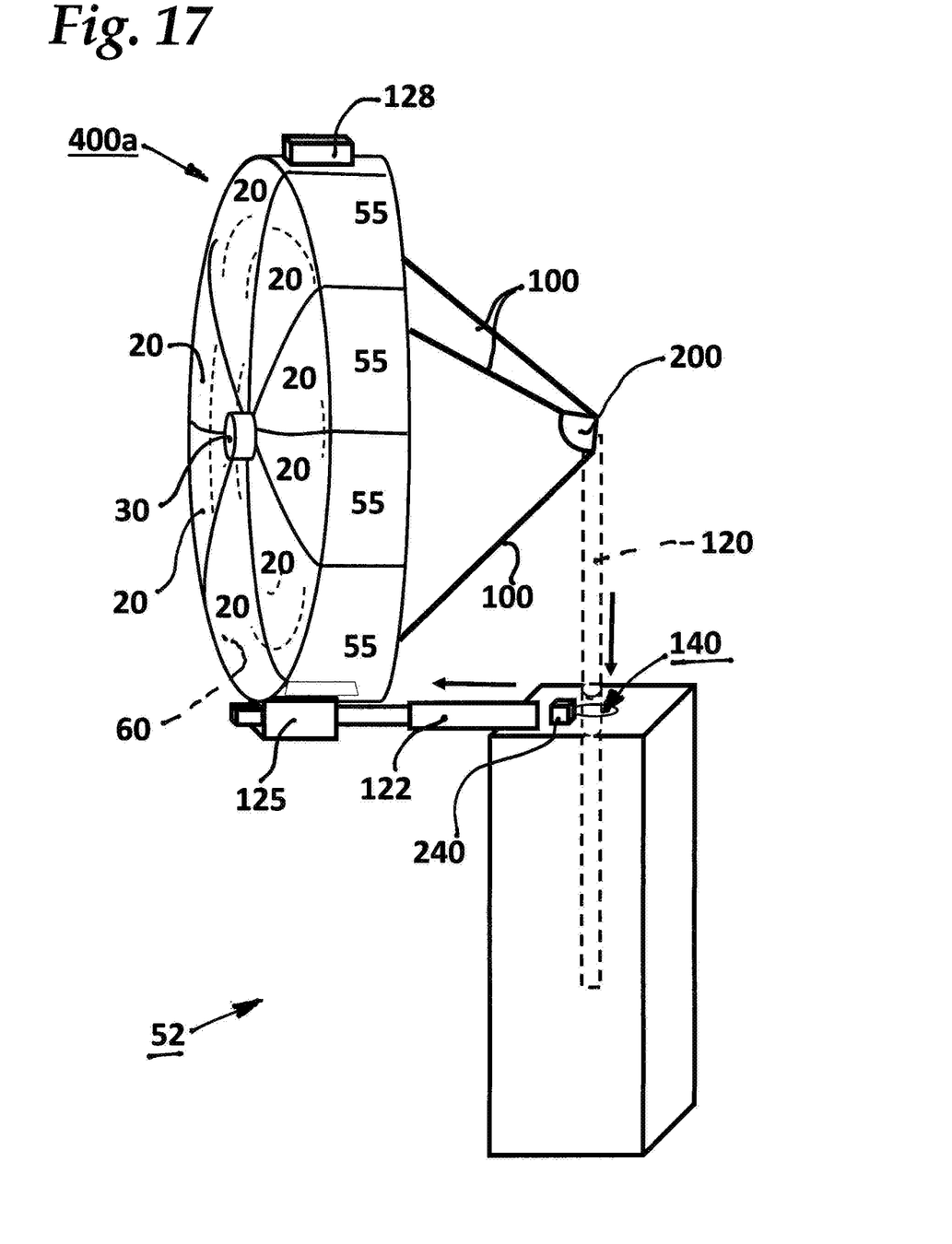
FIG. 17 is a perspective view of the alternative embodiment of the satellite with primary mirror assembly fully deployed

Alternate satellite embodiment 52 shown on FIG. 17 comprises a different deployment of the mirror assembly which is supported not centrally by rod 120, but from its edge by support 125 and rod 122. A counterweight 128 is included to counteract additional moment of inertia supplied by support 125.

Operation

Prior to and during launch mirror supports 20 are stowed along the sides of satellite 50. Mirror material container assembly 30 is stowed inside satellite 50.

Mirror material 60 can be contained in liquid form such as a molten metal or other solidifying liquid, e.g. epoxy, inside material container assembly 30. Alternatively, it can be stored as solid inside assembly 30, to be melted or otherwise liquefied when in space. Mirror supports 20 are stored as a stack to be opened up like a fan once in space.

Mirror Supports Deployment

Figure 3:
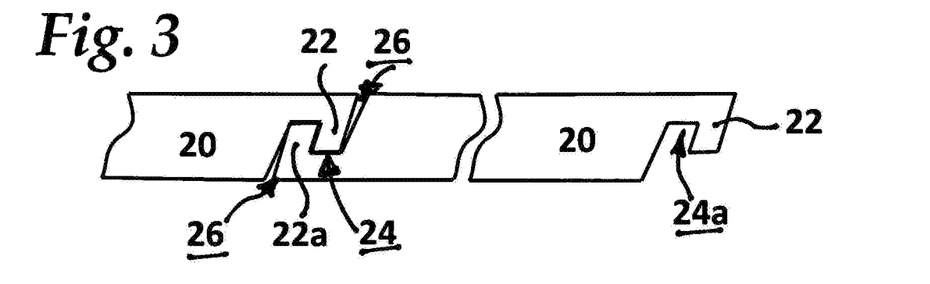
FIG. 3 is a fragmentary cross section of two adjacent interlocked mirror supports prior to primary mirror generation.

Upon reaching space, mirror supports 20 unfold in a circular fashion like a fan, as shown on FIG. 2 and interlock by cooperation of locking ridges 22 and 22a of one support 20 engaging locking grooves 24 of a preceding support 20 and 24a of the following support 20, respectively, as shown on FIG. 3. Such circular deployment of supports 20 is well known in the art where it is used for deployment of segmented parabolic radio antenna reflectors.

Figure 7:
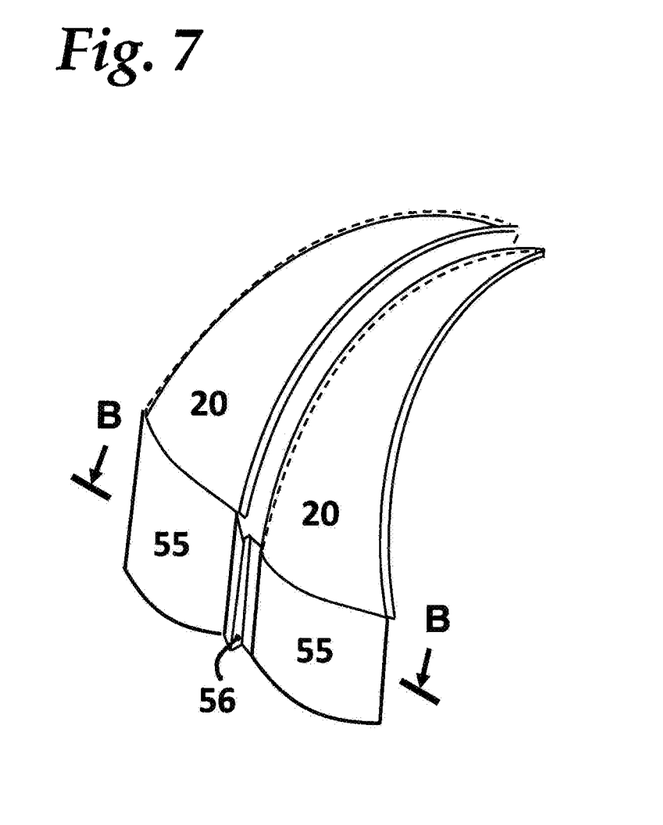
FIG. 7 is a perspective view of the deployed mirror supports with stray light baffles
Figure 8:
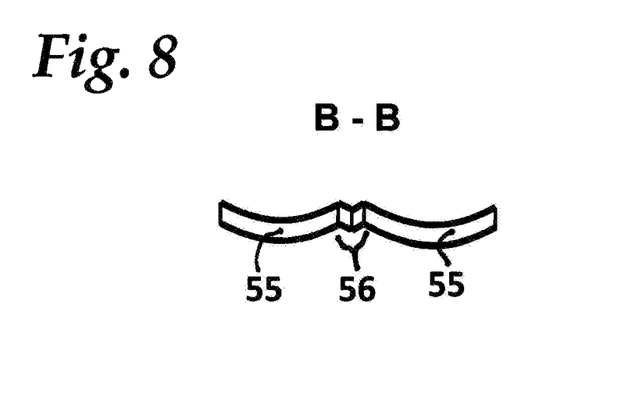
FIG. 8 is a cross-section of deployed mirror supports taken along line B-B on FIG. 7
Figure 9:
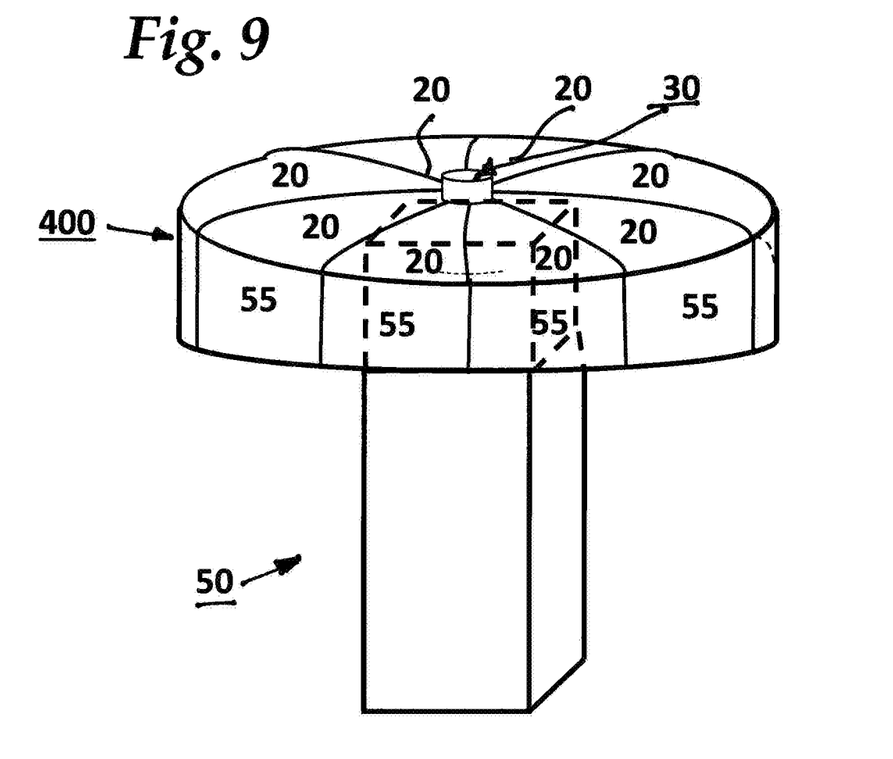
FIG. 9 is a perspective view of the satellite prior to primary mirror generation with mirror supports deployed
Figure 9A:
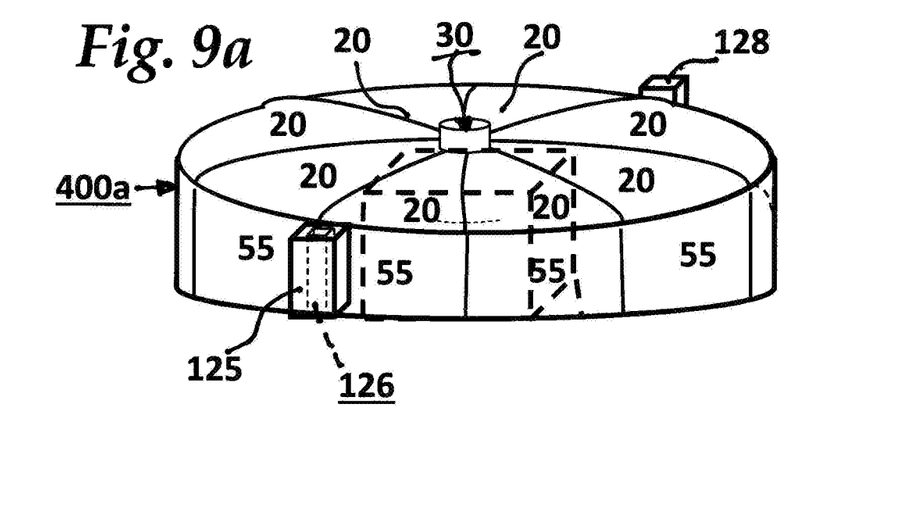
FIG. 9a is a fragmentary perspective view of the alternate deployed mirror support

Optional stray light baffles 55 are flexibly attached to the free edges of supports 20 to permit their deployment along the mirror's optical axis. As shown on FIGS. 7 and 8 baffles 55 are interconnected with pleated light screens 56 to provide continuous light screen upon full deployment.

At deployment, material container assembly 30 is advanced from the interior of satellite 50 so its material discharge port 28 is positioned against the inside surfaces of mirror supports 20.

Parabolic Primary Mirror Generation

To generate the mirror, satellite 50 commences rotation simultaneously around two axes. Referring to FIG. 10 again, satellite 50 spins around its center of mass $C_M$ in Y-axis with angular velocity $\omega_Y$ and simultaneously around its longitudinal Z-axis with angular velocity $\omega_Z$. These rotations can be effected via compressed gas jets, pyrotechnical charges or internal rotating inertial masses.

Rotation around the satellite's Y-axis generates a centripetal force similar to the gravitation force on the Earth's surface. Rotation around the satellite's Z-axis generates its own centripetal force which distributes liquid mirror material 60 onto mirror supports 20. The cooperative action of these two forces generates a parabolic primary mirror surface.

The focal length of the resulting primary mirror can be calculated from the following equation (2).

$$f = \frac{R_{CM}}{2}\left(\frac{\omega_Y}{\omega_Z}\right)^2 \quad (2)$$

Where
  f is the focus length of the resulting primary parabolic mirror
  $R_{CM}$ is the radius of rotation around satellite center of mass
  $\omega_Y$ is angular velocity around satellite's Y-axis
  $\omega_Z$ is angular velocity around satellite's Z-axis The Coriolis force contribution and liquid surface tension of mirror material 60, while present, to a first approximation are not included in this analysis. It is generally accepted that the Coriolis force will effectively tilt the center line of the generated paraboloid. This tilt is predictable and ascertainable from the system operation parameters and will be readily compensated for by the mechanical design of the primary mirror structure and optical system layout. Proper selection of the mirror material 60 and intrinsic material or coating of supports 20 would ensure proper wetting of supports 20 by material 60.

Figure 4:
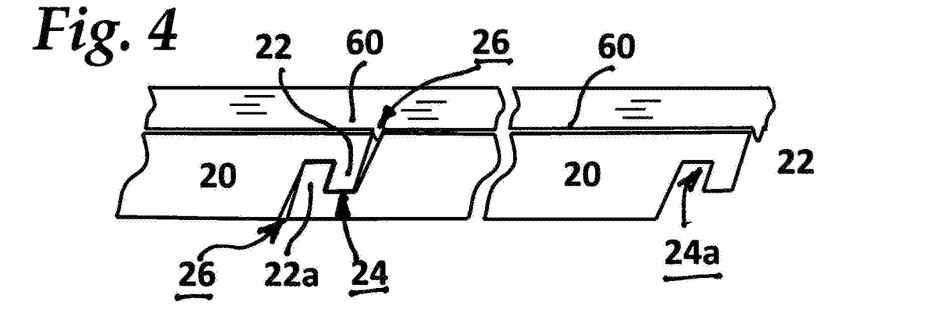
FIG. 4 is a fragmentary cross section of two adjacent interlocked mirror supports after primary mirror generation.
Figure 5:
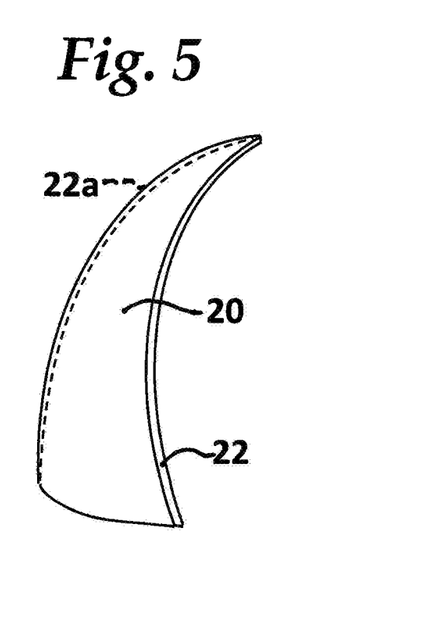
FIG. 5 is a perspective view of an individual mirror support.
Figure 11:
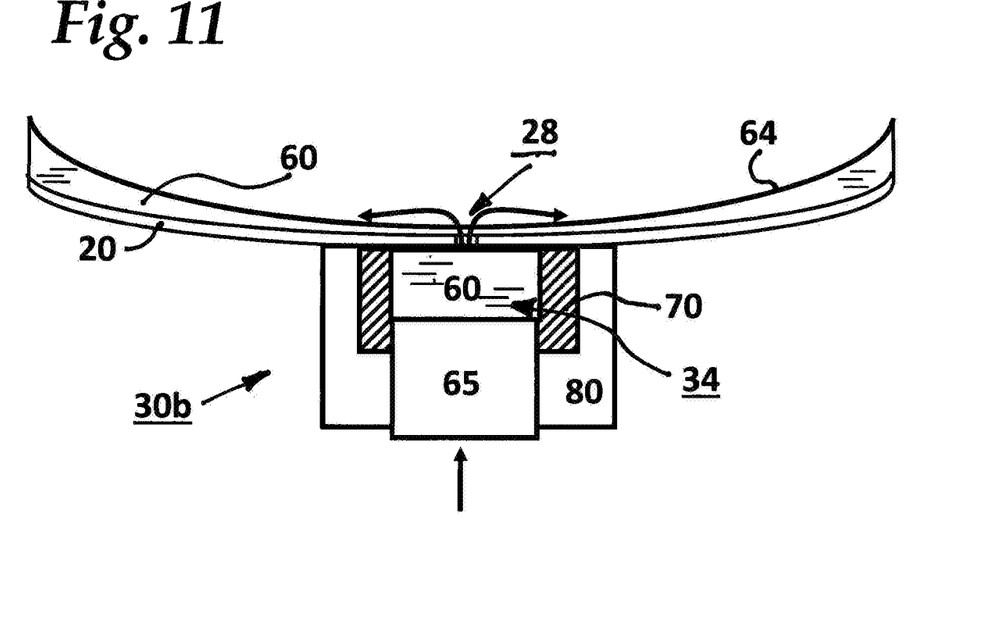
FIG. 11 is a cross-section of the generated primary mirror.

Liquid mirror material 60 held in container assembly 30 is ejected onto supports 20 by the action of the centripetal force arising from angular velocity $\omega_Z$ or by an action of piston 65 via aperture 28 per FIG. 11. The interlocking of supports 20 does not create a seamless mirror surface and gaps 26 are expected to remain between the adjacent supports 20 as shown on FIGS. 3 and 4. However, when liquid mirror material 60 covers the surfaces of supports 20, its outer surface assumes contiguous smooth parabolic surface 64 as shown on FIG. 12.

Mirror material 60 is then permitted to cool off and solidify, at which point the rotation of the satellite can be stopped. The cooling rate of material 60 may have to be controlled for a particular mirror material, for example a flash cooling to create an amorphous metal 'glass' with superior surface quality.

Primary Mirror Deployment

Primary mirror deployment steps are illustrated on FIGS. 13 through 16.

Figure 13:
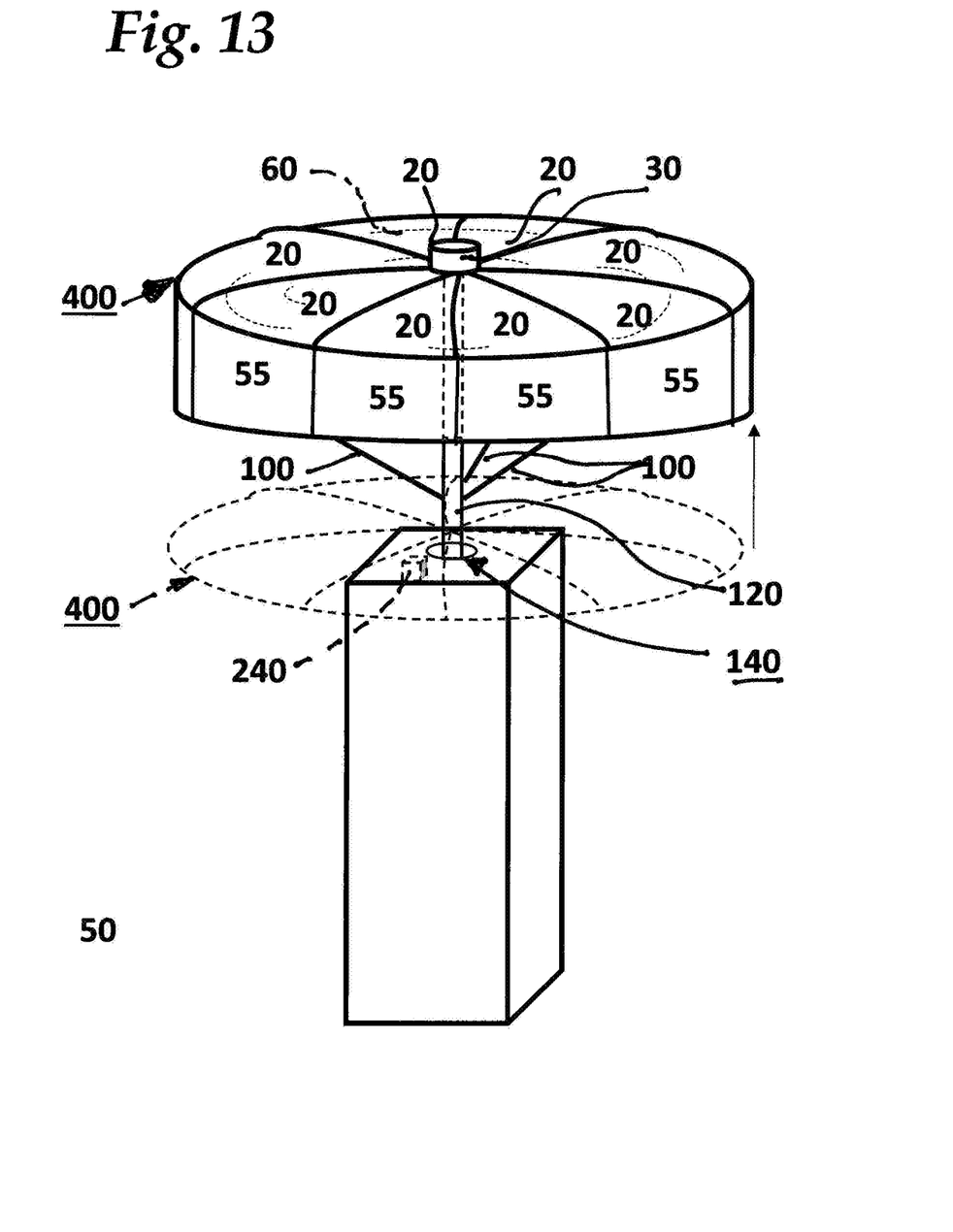
FIG. 13 is a perspective view of the satellite with the primary mirror assembly partially deployed
Figure 14:
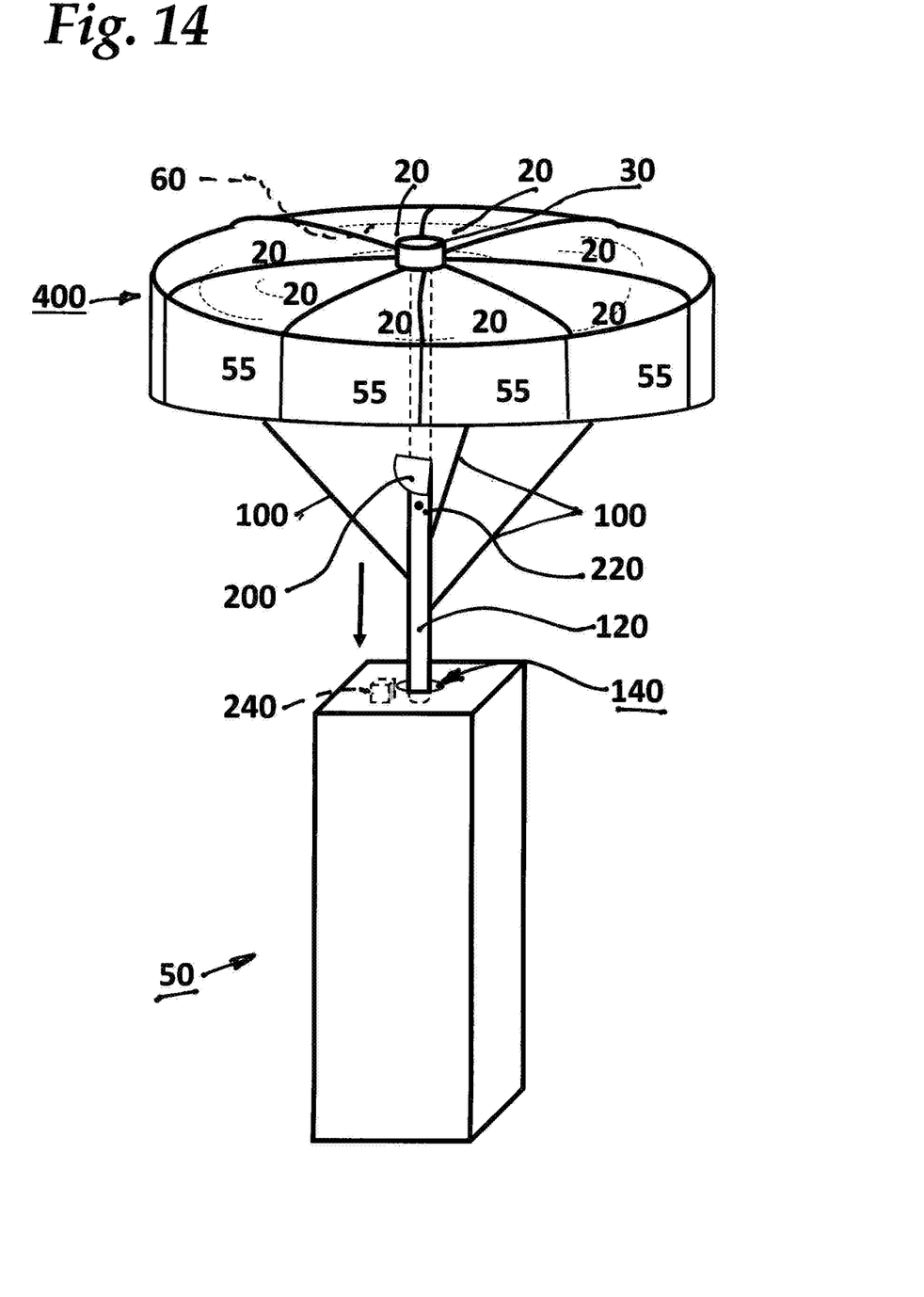
FIG. 14 is a perspective view of the satellite with primary mirror assembly partially deployed and erecting rod retracting

Per FIG. 13 mirror deployment shaft 120 extending from inside satellite's body via aperture 140 positions mirror assembly 400 away from satellite 50 body. Mirror support struts 100 previously stored along shaft 120 extend and lock into their positions on shaft 120.

Figure 15:
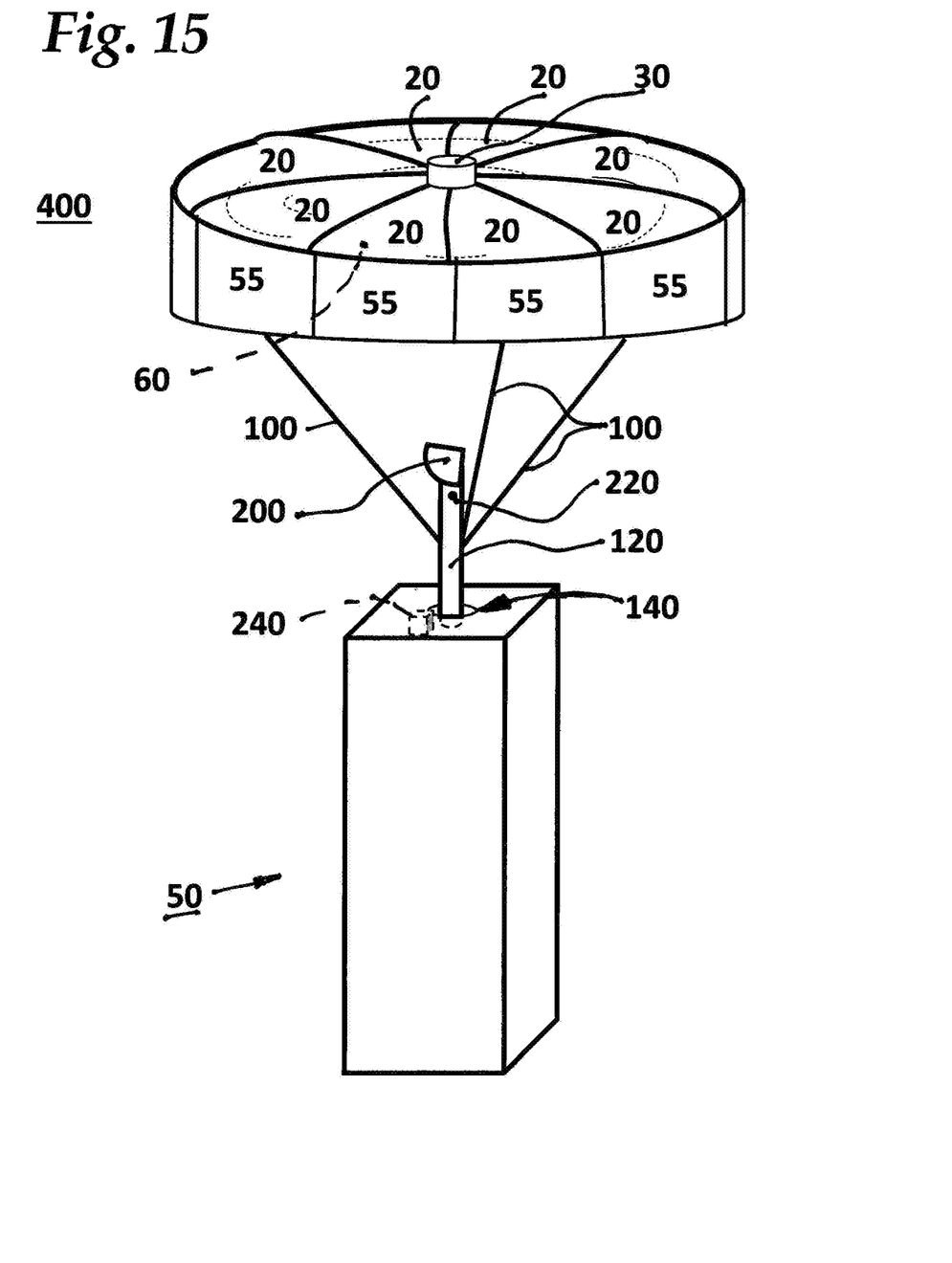
FIG. 15 is a perspective view of the satellite with primary mirror assembly partially deployed and erecting rod fully retracted.

Shaft 120 subsequently recedes into the satellite body (FIG. 14) and assumes end position shown on FIG. 15. Simultaneously, secondary convex imaging mirror 200 is deployed from within shaft 120 where it was stored heretofore.

Referring to FIG. 16, mirror assembly 400 supported by struts 100 is pivoted around axis 220 so that satellite 50 body does not obscure the field of view of mirror assembly 400.

Primary Mirror Testing and Verification

To verify primary mirror shape, its positioning and to test its overall quality satellite 50 is oriented in such a way as to point mirror 400 towards a bright star, which represents a near-ideal point light source.

Per FIG. 16 parallel light rays 300 from a star impinge upon mirror parabolic surface 64 and are reflected onto secondary convex mirror 200 which conveys them to imager 240. The resulting star image, in reality a light spot, detected by the imager effectively represents a Modulation Transfer function ('MTF') of the mirror system. Other stars in the vicinity of the primary target star can be imaged close to the periphery of the field of view of the mirror and their resulting images can be used to ascertain the off-axis system aberrations, such as coma.

By analyzing the shape and size of the imaged light spot the surface quality of mirror, its shape and alignment can be ascertained. By utilizing the results of these measurements all subsequent images taken by the satellite can be digitally enhanced, since the mirror shape and alignment are assumed to remain unperturbed. The calibration and verification can be repeated if there is a suspicion that the mirror shape and alignment have changed in response to, for instance, an inadvertent exposure to direct sunlight and subsequent heating by the sun.

If the mirror has been damaged or seriously deformed or if there was a defect in its casting, and its performance is deemed unacceptable, it can potentially be re-melted and re-cast anew, by reversing the deployment procedures and repeating the material melt and cast operations, if supports 20a comprising heaters 40 are used.

Imaging System Operation

Light from the target object 300 is reflected by primary mirror assembly 400 towards the secondary convex mirror 200 which images the object onto imager 240. This optical configuration is of a typical celestial telescope and is well known in the art.

ADDITIONAL EMBODIMENTS

In alternate satellite embodiment 52 shown on FIG. 17 mirror assembly 400a is supported by rectangular rod 122 which telescopically extends from satellite's body and engaging aperture 126 of support 125 which is connected to mirror support 20 or 20a. The square cross sections of rod 122 and the corresponding aperture 126 prevent mirror assembly 400a from rotating around rod 122 and preserve its alignment with respect to the satellite. A counterweight 128 is included to counteract additional moment of inertia supplied by support 125 when the mirror is generated.

For both satellite embodiments 50 and 52, imager 240 with imaging optics can replace secondary mirror 200 for a more robust overall imaging assembly, provided imager 240 is small enough not to obscure too much of the incoming light.

Figure 6:
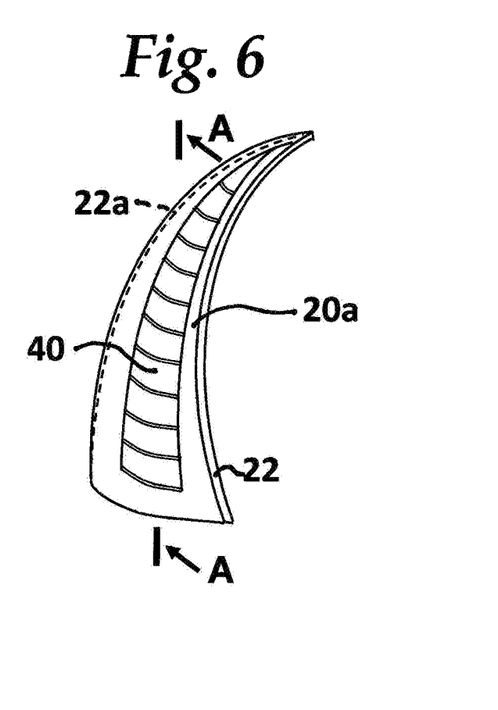
FIG. 6 is a perspective view of another type of individual mirror support containing a heater.
Figure 12:
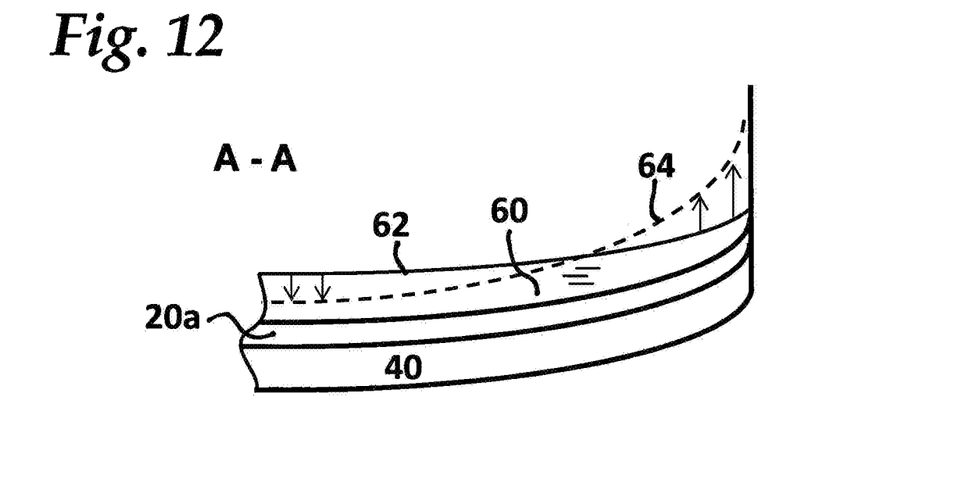
FIG. 12 is detail a cross-section taken along line A-A on FIG. 6 showing mirror material flow

Mirror material 60 can be pre-formed close to the target parabolic shape and pre-loaded onto mirror supports 20a prior to satellite 50 launch to shorten mirror generation time and reduce thermal power required for mirror generation. Referring to FIGS. 6 and 12 support 20a contains pre-formed material layer 60 and heater 40. Heater 40 can be of electrical or pyrotechnic type. Upon their deployment supports 20a are heated and material 60 melted. As the satellite is rotated to generate the mirror, material 60 surface transitions from the original pre-formed surface 62 to the desired final parabolic surface 64 as shown on FIG. 12. Material 60 can be re-melted and the mirror re-generated if it has not been generated properly or if during its operation it's damaged or distorted. Heaters 40 can also be used to anneal the cast mirror to relieve any built-up stresses.

To prevent the generated primary mirror from deforming or outright melting (if low melt materials are used for its construction) and the back of the primary mirror 400 is exposed to sunlight, thermal shields attached to the outside of mirror supports 20 or 20a can be used. These shields can be reflective or thermally insulating, or a combination of the two. The shields of these types are well-known in the art. Alternatively, the back surfaces of supports 20 themselves can be highly polished to reflect sunlight and prevent or minimize heating of cast mirror material 60.

Since primary mirror assembly 400 operates in high vacuum and low temperature (when not in direct sunlight) of space, numerous materials are feasible for mirror constriction, such as metals and alloys, including low melting temperature ones such as gallium, cesium, rubidium, indium, mercury, tin-based solders and lightweight metals: lithium, sodium, potassium, calcium, aluminum and their alloys. A very good reflectance performance is achieved by aluminum, silver and gold. Also, for example, very high broadband light reflectivities, from deep ultra-violet to visible light wavelengths can be achieved by using potassium metal, especially at low temperatures of space. The cooling regime for some metals or alloys may have to be adjusted to create an amorphous, glass-like, rather than crystalline, composition and ensure smooth reflecting surface.

In addition, various epoxies can be used for the primary mirror, as well as thermoplastics, provided their viscosities enable their spreading and mirror form generation.

Amorphous materials such as glasses and organics, for example, even pitch and solidified sugar-based syrups can be heated and cast into smooth-surfaced paraboloids as well. In case of glasses, low melting temperatures frit glasses can be used, to save on the required melting energy. As mentioned hereinabove, these materials can be pre-melted prior to the launch and launched while in liquid form. At low temperatures of space these materials will offer considerable stiffness which will help maintain the precise shape and alignment of mirror assembly 400.

Since these amorphous materials do not generally possess the intrinsic high reflectivity of metals, they can be coated with thin metallic or dielectric reflective films after the primary mirror is generated. To accomplish this a thermal evaporative source can be used to deposit a reflective coating or a set of coatings onto the completed mirror. Since the coating operation will be conducted in the vacuum of space, the environment is uniquely suitable for in-situ coating deposition. Such evaporative deposition source can be positioned close to the focus of the mirror for efficient deposition of the reflective coatings. The deposition can be assisted by simultaneously heating the mirror material by heaters 40 on supports 20*a*.

Several sources utilizing various materials can be used to deposit specialized multi-layer reflective coatings simultaneously or sequentially. Such materials can comprise metals, such as, for example gold, silver or aluminum, or dielectric materials such as $SiO_2$, $Si_3N_4$, $CaF_2$, $GeO_2$, $MgF_2$, $Al_2O_3$. High reflectivity multilayer coatings utilizing these and similar materials are well known in the art. For example, high reflectivity multilayer coatings are made with alternating layers of materials with low refractive indices such as magnesium fluoride ($MgF_2$) and silicon dioxide ($SiO_2$) and materials with large refractive indices, such as zinc sulfide (ZnS) and titanium dioxide ($TiO_2$). For high reflectivities in extreme ultra-violet (EUV) alternating layers of molybdenum (Mo) or tungsten (W) can be interspersed with light-weight materials such as silicon (Si).

Since the mirror will operate exclusively in vacuum, chemically reactive materials otherwise unsuitable for terrestrial applications, such as alkali metals, may also be used for coatings. Some alkali metals, such as potassium mentioned hereinabove, have unique reflectance properties which can be advantageously exploited in space.

Figure 18:
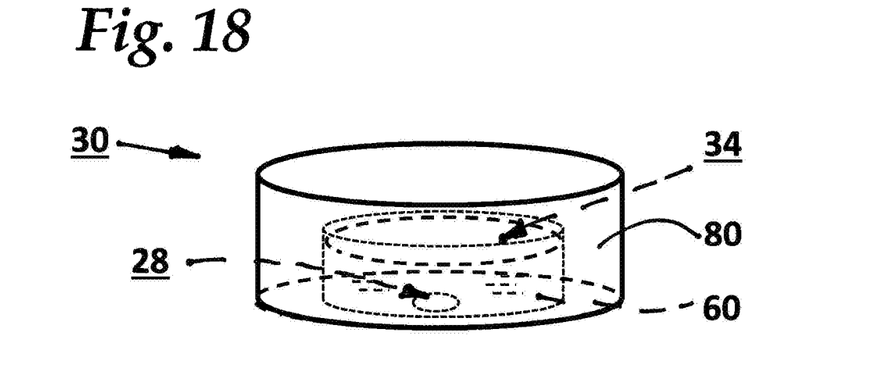
FIGS. 18-20 are perspective views of variants of primary mirror material container assembly.
Figure 19:
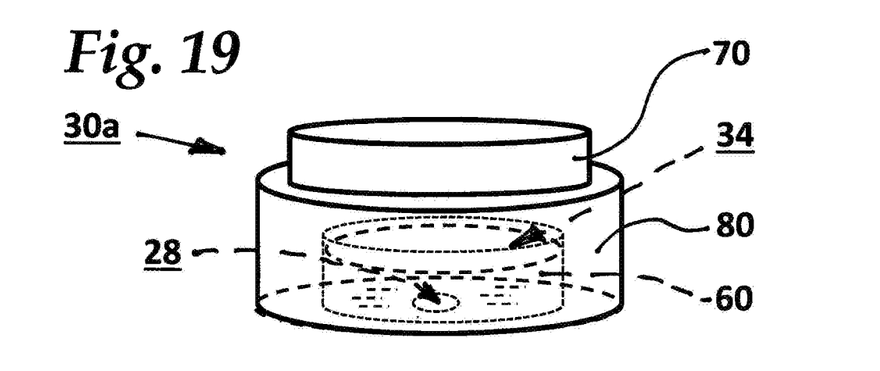
Figure 20:
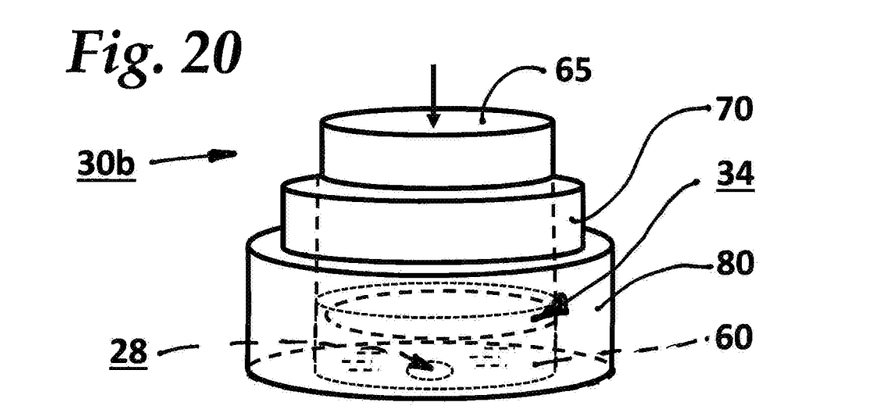

Several variants of the mirror material container system 30 are presented on FIGS. 18 through 20. Container 30 comprises a thermally insulated case 80 with internal cavity 34 containing liquid material 60. Orifice 28 permits the outflow of material 60 onto mirror supports 20 or 20*a*.

Container variant 30*a* in addition comprises heater 70 to melt material 60. This container can be used with material 60 which would be solid during launch.

Container variant 30*b* additionally comprises piston 65 to expel material 60 after it has been melted. Piston 65 can be actuated with a pre-compressed spring, electrical motor driving a screw-type actuator assembly or with a pyrotechnic gas generator.

It should be noted that the features of different container variants can be combined, for example, a piston of container 30*c* can be used with container 30.

Although not shown, the satellite contains wireless communication means for receiving commands and transmitting acquired images.

In addition, although not shown, the satellite includes electronics control-, power- and cooling systems.

To increase mechanical stiffness of mirror 400 a set of molded-in stiffening ribs or cells on its back surface can be provided by forming corresponding corrugations and depressions in mirror supports 20 or 20*a* which will fill up with the liquid material 60 and form the built-in stiffening elements when solidified.

Secondary convex mirror 200 can be replaced by a combination of a flat mirror and an imaging lens system.

Even though the foregoing descriptions concern small, miniature and 'nano' satellites, the methods, components and structures described can be readily utilized for conventional and even large and extremely large satellites.

Although descriptions provided above contain many specific details, they should not be construed as limiting the scope of the present invention.

Thus, the scope of this invention should be determined from the appended claims and their legal equivalents.

I claim:

1. A space-based imaging system comprising
   an imaging mirror,
   said mirror having a generally parabolic cross section along at least one of its axes,
   said mirror supported by a support structure,
   wherein said mirror is produced from a solidified liquid precursor material while said imaging system is in space,
   wherein said support structure comprises substantially a disk,
   said disk further comprising a top surface and a bottom surface,
   said disk further comprising circular edge wall,
   said wall perpendicular to said top surface of said disk,
   said wall located along a periphery of said disk,
   said wall located on said top surface of said disk and in communication therewith,
   said disk capable of being rotated around a first axis,
   said first axis perpendicular to said top surface of said disk and disposed through a center of mass of said disk,
   said disk capable of being simultaneously rotated around a second axis,
   said second axis orthogonal to said first axis,
   wherein center of rotation around said second axis is disposed at a distance from said top surface of said disk.

2. The system of claim 1, further comprising at least one reflective coating on said mirror surface, said coating deposited onto said mirror surface while said imaging system is in space.

3. The system of claim 1 wherein said support structure further comprises at least one light baffle.

4. The system of claim 1, wherein said precursor material is selected from the group consisting of:
   a. alkali metals,
   b. aluminum,
   c. mercury,
   d. metals and alloys thereof,
   e. metal glasses and alloys thereof,
   f. epoxies and mixtures thereof,
   g. epoxies containing thermal expansion coefficient-reducing additives,
   h. thermoplastic polymers and mixtures thereof,
   i. thermoplastic polymers containing thermal expansion coefficient-reducing additives,
   j. thermosetting polymers and mixtures thereof,
   k. thermosetting polymers containing thermal expansion coefficient-reducing additives,
   l. glasses and mixtures thereof,
   m. pitch and mixtures thereof,
   n. sugar solutions and
   o. aqueous solutions.

5. The system of claim 1, wherein said precursor material is stored in liquid form within said system prior to launch.

6. The system of claim 1, wherein said precursor material is liquefied while in space prior to production of said mirror.

7. A space-based imaging system comprising an imaging mirror assembly,
   said mirror assembly further comprising a mirror and mirror support,
   said support comprising substantially a disk,
   said disk further comprising a top surface and a bottom surface,
   said top surface further comprising a substantially circular wall along its periphery, said wall perpendicular to said top surface and in cooperation therewith,
   said imaging system capable of rotating along two orthogonal axes, namely, first axis and second axis, said first axis passing perpendicular to said top surface of said support and through center of gravity of said support, said second axis orthogonal to said first axis, wherein a center of rotation around said second axis is displaced from said top surface of said support,
   said imaging system further comprising a dispensing mechanism for introducing liquid precursor material into said support to produce said mirror upon solidification,
   said mirror produced while said system is in space.

8. The system of claim 7 wherein said precursor material is selected from the group consisting of:
   a. alkali metals,
   b. aluminum,
   c. mercury,
   d. metals and alloys thereof,
   e. metal glasses and alloys thereof,
   f. epoxies and mixtures thereof,
   g. epoxies containing thermal expansion coefficient-reducing additives,
   h. thermoplastic polymers and mixtures thereof,
   i. thermoplastic polymers containing thermal expansion coefficient-reducing additives,
   j. thermosetting polymers and mixtures thereof,
   k. thermosetting polymers containing thermal expansion coefficient-reducing additives,
   l. glasses and mixtures thereof,
   m. pitch and mixtures thereof,
   n. sugar solutions and
   o. aqueous solutions.

9. The system of claim 7, wherein said mirror support further comprises at least one light baffle.

10. The system of claim 7, wherein said mirror support further comprises at least one heating element.

11. The system of claim 7 wherein said dispensing mechanism further comprises a container, said container containing said precursor material, said container further comprising an egress aperture for said precursor material, said aperture communicating with said mirror support.

12. The container of claim 11 further comprising at least one heater element.

13. The container of claim 11, further comprising a piston within,
   said piston capable of moving inside said container,
   said piston capable of ejecting said precursor material through said egress aperture,
   said piston being driven by a piston driving mechanism.

14. The container of claim 13 further comprising at least one heater element.

15. The container of claim 13 wherein said piston driving mechanism is selected from the group consisting of:
   a) compressed gas,
   b) compressed elastic element,
   c) electrical motor drive assembly,
   d) pyrotechnical gas generator.

16. A method of producing in space imaging systems based on paraboloid mirrors comprising the steps of:
   a. providing mirror support structure, said support structure comprising substantially a circular disk, said disk comprising two surfaces, namely, a top surface and a bottom surface, said disk further comprising a circular wall, said wall perpendicular to said top surface, said wall located along a periphery of said disk, said wall located on said top surface and in communication therewith,
   b. spinning said support structure around a first axis, said first axis perpendicular to said top surface of said disk and disposed through a center of mass of said disk,
   c. simultaneously spinning said support structure around a second axis, said second axis orthogonal to said first axis, wherein center of rotation around said second axis is disposed at a distance from said top surface of said disk,
   d. placing a liquid mirror precursor material onto said top surface of said disk,
   e. allowing said precursor material to assume a parabolic shape as a result of said structure spinning around said first and said second axes,
   f. subsequently allowing said precursor material to solidify in said parabolic shape.

17. The method of claim 16, wherein said liquid precursor material is stored in liquid form within said system prior to production of said mirror.

18. The method of claim 16, wherein said liquid precursor material is produced in space by melting a solid precursor material.

19. The method of claim 16, wherein said precursor material is selected from the group consisting of:
   a. alkali metals,
   b. aluminum,
   c. mercury,
   d. metals and alloys thereof,
   e. metal glasses and alloys thereof,
   f. epoxies and mixtures thereof,
   g. epoxies containing thermal expansion coefficient-reducing additives,
   h. thermoplastic polymers and mixtures thereof,
   i. thermoplastic polymers containing thermal expansion coefficient-reducing additives,
   j. thermosetting polymers and mixtures thereof,
   k. thermosetting polymers containing thermal expansion coefficient-reducing additives,
   l. glasses and mixtures thereof,
   m. pitch and mixtures thereof,
   n. sugar solutions and
   o. aqueous solutions.

20. The method of claim 16, further comprising the steps of depositing at least one reflective coating on a surface of said mirror upon its solidification.

21. The method of claim 16, wherein said support structure further comprises at least one heating element.

22. The method of claim 16, wherein said mirror precursor material upon solidification can be subsequently re-melted and re-formed.

* * * * *